US012181931B2

(12) United States Patent
Lawrence (10) Patent No.: US 12,181,931 B2
(45) Date of Patent: Dec. 31, 2024

(54) TECHNOLOGIES FOR ULTRASOUND-BASED HINGE ANGLE ESTIMATION

(71) Applicant: Intel Corporation, Santa Clara, CA (US)

(72) Inventor: Sean J. W. Lawrence, Whitefield (IN)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 17/359,009

(22) Filed: Jun. 25, 2021

(65) Prior Publication Data

US 2021/0325940 A1 Oct. 21, 2021

(51) Int. Cl.
*G06F 1/16* (2006.01)
*G01B 17/00* (2006.01)
*G01S 15/08* (2006.01)
*G06F 1/3218* (2019.01)

(52) U.S. Cl.
CPC ............ *G06F 1/1681* (2013.01); *G01B 17/00* (2013.01); *G01S 15/08* (2013.01); *G06F 1/3218* (2013.01)

(58) Field of Classification Search
CPC combination set(s) only.
See application file for complete search history.

(56) References Cited

U.S. PATENT DOCUMENTS 5,436,580 A 7/1995 Kellmann et al.
6,542,436 B1 4/2003 Myllyla
8,098,233 B2 * 1/2012 Hotelling ............ G06F 3/04886
345/173
2010/0281984 A1 * 11/2010 Ko ........................ G06F 3/0433
73/632
2015/0085620 A1 3/2015 Macours
2017/0329928 A1 11/2017 Song et al.
2018/0160235 A1 6/2018 Lesso et al.
2019/0187261 A1 6/2019 Parada et al.
2019/0277966 A1 9/2019 Schoessler et al.

(Continued)

FOREIGN PATENT DOCUMENTS

CN 115525102 A * 12/2022 ............ G01B 17/00
DE 102022105924 A1 * 12/2022 ............ G01B 17/00
EP 3438781 A1 * 2/2019 ........... G06F 1/1616

OTHER PUBLICATIONS

Google Nest Help, "Turn on Ultrasound sensing," available at https://support.google.com/googlenest/answer/9509981?hl=en, accessed May 13, 2021 (2 pages).

(Continued)

*Primary Examiner* — Daniel Pihulic
(74) *Attorney, Agent, or Firm* — Alliance IP, LLC (57) ABSTRACT

Techniques for ultrasound-based hinge estimation are disclosed. In the illustrative embodiment, a speaker in a base portion of a computing device generates an ultrasonic sound pulse. The pulse is sensed by a microphone in a lid portion of the computing device. The time-of-flight of the sound pulse from the speaker to the microphone is used to determine the distance between the speaker and the microphone. The angle of the lid portion relative to the microphone portion can then be determined based on the position of the speaker, the position of the microphone, and the distance between the speaker and the microphone.

25 Claims, 7 Drawing Sheets

(56) References Cited

U.S. PATENT DOCUMENTS

2019/0302916 A1   10/2019  Thomas
2021/0325940 A1*  10/2021  Lawrence ............ G06F 1/1618

OTHER PUBLICATIONS

Shinnosuke Hirata et al., "Accurate measurement of distance and velocity using ultrasonic waves," available at https://acoustics.org/pressroom/httpdocs/155th/hirata.htm (accessed Apr. 30, 2021) (4 pages).

* cited by examiner

TECHNOLOGIES FOR ULTRASOUND-BASED HINGE ANGLE ESTIMATION

BACKGROUND

Clamshell-type devices with a base portion and a lid portion connected by a hinge often are able to sense the orientation of the base portion relative to the lid portion. Such an ability allows the device to respond to changes in the orientation of the lid portion, such as entering a low-power state when the lid is closed. The orientation of the lid portion relative to the base portion can be sensed using hinge sensors, such as resistive or capacitive contact sensors or magnetic-based sensors.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
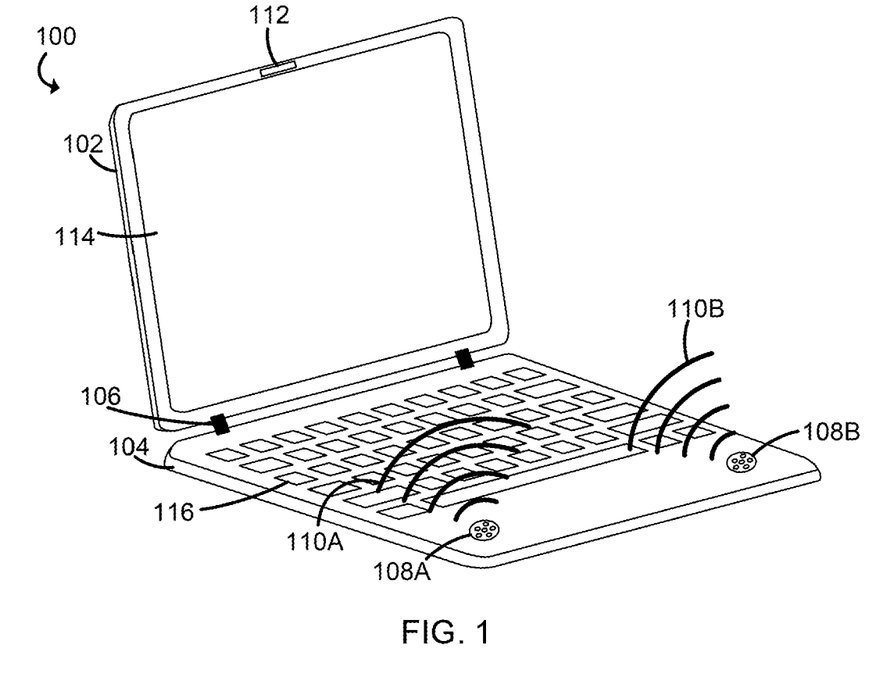
FIG. 1 is a simplified drawing of at least one embodiment of a computing device for determining an angle of a lid relative to a base.

Referring to FIG. 1, in an illustrative embodiment, a computing device 100 has a lid portion 102 connected to a base portion 104 by a hinge 106. In use, speakers 108A and/or 108B can generate ultrasonic sounds 110A and/or 110B, respectively. A microphone 112 senses the sounds 110A and/or 110B. By comparing the timing of the generation of the sounds 110A/110B and the timing of the sensing of the sounds 110A/110B, the computing device 100 can determine the time-of-flight from the speaker 108A/108B to the microphone 112. As described in more detail below, the computing device 100 can use the time-of-flight to determine the angle of the hinge 106 (i.e., the angle of the lid portion 102 and the base portion 104).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. Terms modified by the word "substantially" include arrangements, orientations, spacings, or positions that vary slightly from the meaning of the unmodified term. For example, a stereoscopic camera with a field of view of substantially 180 degrees includes cameras that have a field of view within a few degrees of 180 degrees.

The computing device 100 may be embodied as any type of computing device that has a lid portion 102 or similar housing and a base portion 104 or similar housing that can rotate relative to each other. For example, the computing device 100 may be embodied as or otherwise be included in, without limitation, a laptop computer, a notebook computer, a cellular phone, a smartphone, an e-reader, a tablet computer, a two-display device (e.g., with a display in the lid portion 102 and the base portion 104), a multiprocessor system, a processor-based system, a consumer electronic device, a wearable computer, a handset, a messaging device, a camera device, and/or any other computing device.

The illustrative lid portion 102 includes a display 114, and the illustrative base portion 104 includes a keyboard 116. It should be appreciated that, in some embodiments, both the lid portion 102 and the base portion 104 may have a different set of components. For example, in some embodiments, the lid portion 102 and the base portion 104 may each have a display 114, the base portion 104 may have a microphone 112 and the lid portion may have a speaker 108, etc. In some embodiments, the computing device 100 may not have a preferred orientation, making the labeling of one part of the computing device 100 the lid portion 102 and another part the base portion 104 arbitrary. The lid portion 102 may also be described as a housing 102, and the base portion 104 may also be described as a housing 104. It should be appreciated that either the housing 102 and/or the housing 104 may have a speaker 108, microphone 112, display 114, keyboard 116, and/or any other suitable component.

Figure 2:
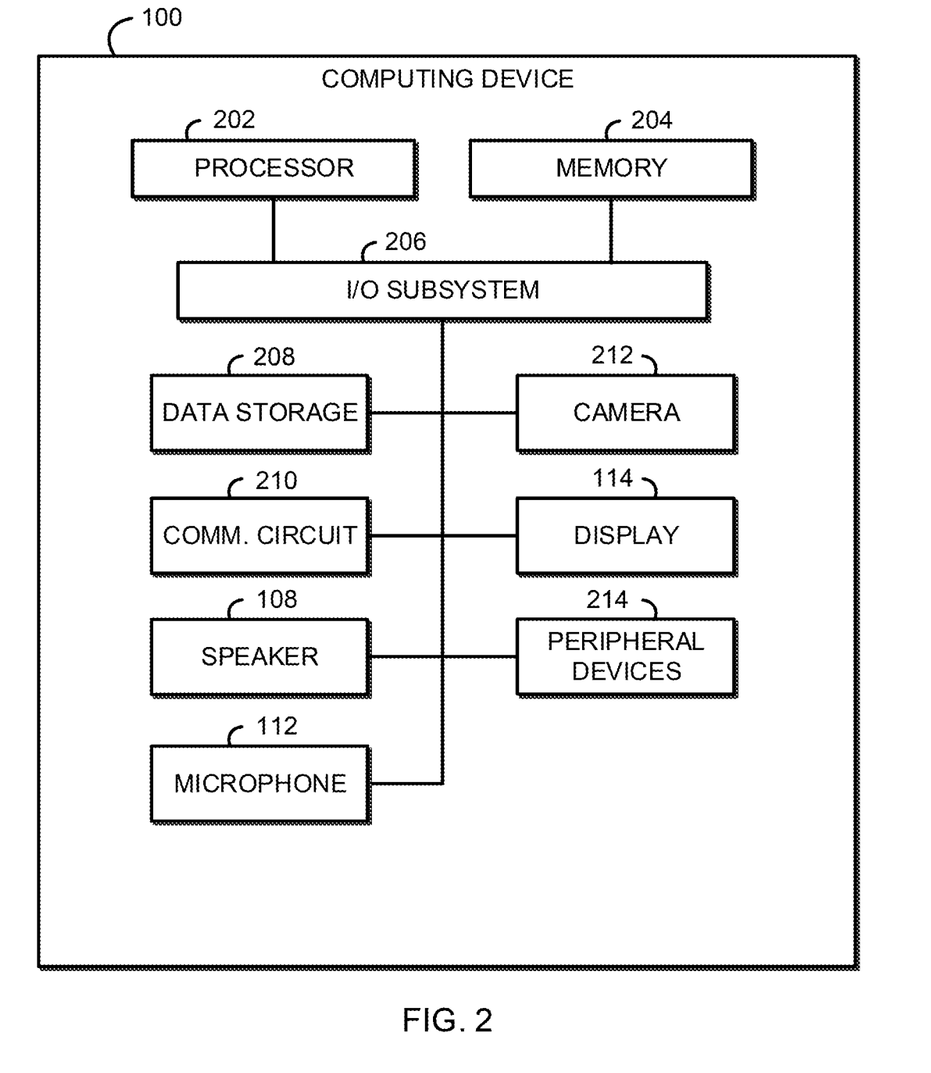
FIG. 2 is a simplified block diagram of at least one embodiment of the computing device of FIG. 1.

Referring now to FIG. 2, in one embodiment, a block diagram of the computing device 100 shows various components of the computing device 100. The illustrative computing device 100 includes one or more processors 202, a memory 204, an input/output (I/O) subsystem 206, data storage 208, a communication circuit 210, one or more speakers 108, one or more microphones 112, a camera 212, the display 114, and one or more peripheral devices 214. In some embodiments, one or more of the illustrative components of the computing device 100 may be incorporated in, or otherwise form a portion of, another component. For example, the memory 204, or portions thereof, may be incorporated in the processor 202 in some embodiments. In some embodiments, one or more of the illustrative components may be physically separated from another component. In some embodiments, the computing device 100 may include a companion die to act as a lid controller hub in the lid portion 102. The companion die may include a processor, memory, data storage, etc., which may be incorporated together in a system-on-a-chip (SoC). In some embodiments, the companion die may perform various functions, such as controlling a camera 212 in the lid portion 102, instructing the speakers 108 to generate ultrasound pulses, using the microphone 112 to sense the ultrasound pulses, determining the angle of the lid portion 102 relative to the base portion 104 based on the ultrasound pulses sensed, etc.

The processor 202 may be embodied as any type of processor capable of performing the functions described herein. For example, the processor 202 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the computing device 100 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the computing device 100. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 206 may connect various internal and external components of the computing device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 206 may form a portion of a system-on-a-chip (SoC) and be incorporated, along with the processor 202, the memory 204, and other components of the computing device 100 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The communication circuit 210 may be embodied as any type of interface capable of interfacing the computing device 100 with other computing devices, such as over one or more wired or wireless connections. In some embodiments, the communication circuit 210 may be capable of interfacing with any appropriate cable type, such as an electrical cable or an optical cable. The communication circuit 210 may be configured to use any one or more communication technology and associated protocols (e.g., Ethernet, Bluetooth®, Wi-Fi®, WiMAX, near field communication (NFC), etc.). The communication circuit 210 may be located on silicon separate from the processor 202, or the communication circuit 210 may be included in a multi-chip package with the processor 202, or even on the same die as the processor 202. The communication circuit 210 may be embodied as one or more add-in-boards, daughtercards, network interface cards, controller chips, chipsets, specialized components such as a field-programmable gate array (FPGA) or application-specific integrated circuit (ASIC), or other devices that may be used by the computing device 202 to connect with another computing device. In some embodiments, communication circuit 210 may be embodied as part of a system-on-a-chip (SoC) that includes one or more processors or may be included on a multichip package that also contains one or more processors. In some embodiments, the communication circuit 210 may include a local processor (not shown) and/or a local memory (not shown) that are both local to the communication circuit 210. In such embodiments, the local processor of the communication circuit 210 may be capable of performing one or more of the functions of the processor 202 described herein. Additionally or alternatively, in such embodiments, the local memory of the communication circuit 210 may be integrated into one or more components of the computing device 202 at the board level, socket level, chip level, and/or other levels.

The camera 212 may include one or more fixed or adjustable lenses and one or more image sensors. The image sensors may be any suitable type of image sensor, such as a CMOS or CCD image sensor. The camera 212 may have any suitable aperture, focal length, field of view, etc. For example, the camera 212 may have a field of view of 60-110° in the azimuthal and/or elevation directions. In some embodiments, the computing device 100 may include a low-power camera 212. The low-power camera 212 may have a low resolution, such as a resolution of 16 by 16. In some embodiments, the low-power camera 212 may have images processed by and/or may be controlled by a companion die in the lid portion 102.

The speaker 108 may include one or more speakers 108, such as an array of speakers 108. The speaker 108 is configured to receive electrical signals and generate sound signals based on the electrical signals. The speaker 108 may have any suitable frequency range, such as 50-40,000 Hertz. In some embodiments, the speaker 108 may include a speaker array that can use beamforming to direct a sound signal in a particular directional pattern, such as towards the microphone 112.

The microphone 112 is configured to sense sound waves and output an electrical signal indicative of the sound waves. In the illustrative embodiment, the computing device 100 may have more than one microphone 112, such as an array of microphones 112 in different positions. Having more than one microphone 112 may enable the computing device 100 to perform sound localization, enabling the computing device 100 to spatially filter audio. The microphone 112 may be sensitive to any suitable frequency range, such as 50-40,000 Hertz. The microphone 112 may sample an analog-to-digital converter at any suitable frequency, such as 10,000 to 60,000 samples per second. The microphone 112 may use any suitable bit depth for the samples, such as 4, 8, 12, 16, 20, or 24-bit depth.

The display 114 may be embodied as any type of display on which information may be displayed to a user of the computing device 100, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology.

In some embodiments, the computing device 100 may include other or additional components, such as those commonly found in a computing device. For example, the computing device 100 may also have peripheral devices 214, such as a keyboard, a mouse, an external storage device, etc. In some embodiments, the computing device 100 may be connected to a dock that can interface with various devices, including peripheral devices 124. In some embodiments, the peripheral devices 214 may include additional sensors that the computing device 100 can use to monitor the orientation of the lid portion 102 relative to the base portion 104, such as resistive or capacitive contact sensors or magnetic-based sensors.

Figure 3:
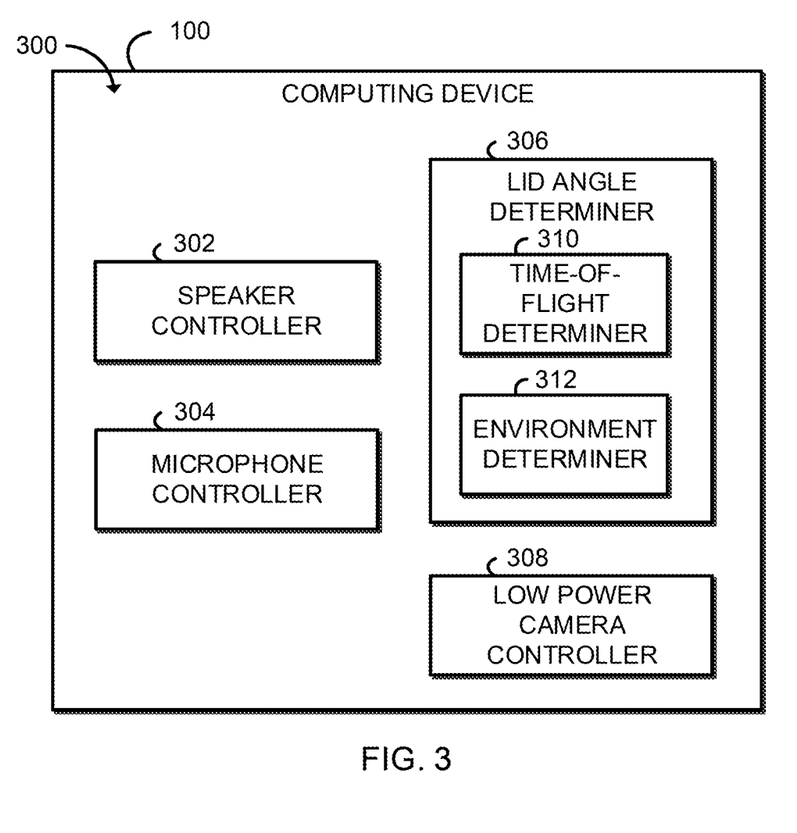
FIG. 3 is a simplified block diagram of at least one embodiment of an environment that may be established by the computing device of FIG. 1.

Referring now to FIG. 3, in an illustrative embodiment, the computing device 100 establishes an environment 300 during operation. The illustrative environment 300 includes a speaker controller 302, a microphone controller 304, a lid angle determiner 306, and a low-power camera controller 308. The various modules of the environment 300 may be embodied as hardware, software, firmware, or a combination thereof. For example, the various modules, logic, and other components of the environment 300 may form a portion of, or otherwise be established by, the processor 202, the memory 204, the data storage 208, or other hardware components of the computing device 100, such as a companion die in the lid portion 102. As such, in some embodiments, one or more of the modules of the environment 300 may be embodied as circuitry or collection of electrical devices (e.g., speaker controller circuitry 302, microphone controller circuitry 304, lid angle determiner circuitry 306, etc.). It should be appreciated that, in such embodiments, one or more of the circuits (e.g., the speaker controller circuitry 302, the microphone controller circuitry 304, the lid angle determiner circuitry 306, etc.) may form a portion of one or more of the processor 202, the memory 204, the I/O subsystem 206, the data storage 208, a companion die, and/or other components of the computing device 100. For example, in some embodiments, some or all of the modules may be embodied as the processor 202 as the memory 204 and/or data storage 208 storing instructions to be executed by the processor 202. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 202 or other components of the computing device 100. It should be appreciated that some of the functionality of one or more of the modules of the environment 300 may require a hardware implementation, in which case embodiments of modules that implement such functionality will be embodied at least partially as hardware.

The speaker controller 302, which may be embodied as hardware, firmware, software, virtualized hardware, emulated architecture, and/or a combination thereof as discussed above, is configured to control one or more speakers 108. In the illustrative embodiment, the speaker controller 302 may cause a speaker 108 to generate an ultrasonic sound pulse. The ultrasonic sound pulse may be at any suitable ultrasonic frequency, such as 20-40 kilohertz. An ultrasonic sound pulse may be any suitable duration, such as 25 microseconds to 50 milliseconds. More generally, the speaker controller 302 can make any suitable ultrasonic sound, such as an ultrasonic sound with any suitable combination of one or more frequencies that may have a particular phase or timing relation, a chirped ultrasonic sound pulse, etc. Of course, the speaker controller 302 or some other component of the computing device 100 may also be able to generate sounds in the range of human hearing or near the range of human hearing. For example, in one embodiment, near-ultrasound waves may be used with a frequency between 17,000-24,000 Hertz. In some embodiments, the speaker controller 302 can use beamforming techniques to cause an array of speakers 108 to direct a sound signal in a particular direction, such as towards one or more possible locations of the microphone 112.

The microphone controller 304, which may be embodied as hardware, firmware, software, virtualized hardware, emulated architecture, and/or a combination thereof as discussed above, is configured to control one or more microphones 112. The microphone controller 304 receives signals from the one or more microphones 112. In some embodiments, the microphone controller 304 may apply a filter to signals from the microphones that pass the ultrasonic sounds generated by the speaker controller 302 in order to determine the time-of-flight to the microphone 112. Such an approach may protect the privacy of the user of the computing device 100 by filtering out any noises of speech that should not be accessible to the computing device 100 when the microphones 112 are not in use. In some embodiments, the microphone controller 304 can use beamforming techniques to process signals from an array of microphones 112 to apply spatial filters, such as selectively filtering for sound coming from one or more possible locations of the speakers 108.

The lid angle determiner 306, which may be embodied as hardware, firmware, software, virtualized hardware, emulated architecture, and/or a combination thereof as discussed above, is configured to determine an angle of the lid portion 102 relative to the base portion 104. To do so, the lid angle determiner 306 uses a time-of-flight determiner 310 to determine a time-of-flight from the speaker 108 to the microphone. It should be appreciated that, in the illustrative embodiment, the microphone 112 and the speaker 108 (and/or the microphone controller 304 and the speaker controller 302) are driven by or otherwise synchronized to the same clock. As such, in the illustrative embodiment, the relative timing of a signal being generated by the speaker 108 and sensed by the microphone 112 can be determined precisely, without needing to compensate for any difference in timekeeping between the two devices.

Using the time-of-flight information, the lid angle determiner 306 can determine the distance between the speaker 108 and the microphone 112. For example, if the speed of sound is 343 meters per second, then an ultrasonic pulse that takes 729 microseconds to propagate from the speaker 108 to a microphone 112 indicates a distance between the speaker 108 and the microphone 112 of $$343 \frac{\text{meters}}{\text{second}} \times 729 \text{ microseconds} = 25 \text{ centimeters.}$$

The precision of the measurement of the time-of-flight may depend on the frequency of the sound being used. For example, the computing device 100 may be able to determine the timing of the sensing of an ultrasonic pulse to the generation of the pulse to within, e.g., one-half of a wavelength of the carrier wave. For a carrier frequency of, e.g., 40 kHz, such a precision would lead to an uncertainty in the time-of-flight of about 6 microseconds, which would correspond to a distance uncertainty of about 4 millimeters. In other embodiments, the computing device may be able to determine the timing of the sensing of an ultrasonic pulse to the generation of the pulse to within, e.g., 0.01-1 wavelength of the carrier wave.

In the illustrative embodiment, the time-of-flight determiner 310 determines the time-of-flight by comparing a pulse received at a microphone 112 with a pulse sent by a speaker 108. In other embodiments, the time-of-flight determiner 310 may determine the time-of-flight in a different manner. For example, the time-of-flight determiner 310 may determine a phase between a signal generated by the speaker 108 and detected at the microphone 112 for each of two or more frequencies, and use the phases to determine a time-of-flight or distance between the speaker 108 and the microphone 112.

It should be appreciated that the speed of sound is not constant but may depend on, e.g., temperature, humidity, ambient pressure, etc. In some embodiments, the time-of-flight determiner 310 may use a speed of sound of, e.g., 343 meters per second regardless of the ambient conditions. In other embodiments, an environment determiner 312 may determine one or more parameters of the environment of the computing device 100, such as temperature, humidity, pressure, etc. The environment determiner 312 may use one or more sensors of the computing device 100, such as a temperature sensor, a hygrometer, a pressure sensor, etc. In some embodiments, the environment determiner 312 may locate the physical position of the computing device 100 using, e.g., a signal from a global positioning satellite (GPS) chip, a local network address, local WiFi devices, etc. The environment determiner 312 may access a server or other Internet-connected device to determine the location or altitude of the computing device 100 and/or to determine information about the environment of the computing device 100, such as temperature, humidity, or pressure. The parameters for temperature, humidity, and/or pressure may then be used to determine a local speed of sound more precisely.

With the knowledge of the distance between the speaker 108 and the microphone 112, the lid angle determiner 306 can determine the angle between the lid portion 102 and the base portion 104. In the illustrative embodiment, the lid angle determiner 306 first determines a position of the speaker 108 and a position of the microphone 112. The lid angle determiner 306 may, e.g., access information related to the particular model of the computing device 100 that is stored locally and/or remotely. In some embodiments, the lid angle determiner 306 may undergo a calibration period, such as by monitoring the distance between the speaker 108 and the microphone 112 as the lid portion 102 is rotated relative to the base portion 104 by a user. For example, a minimum distance between the speaker 108 and the microphone 112 may correspond to the computing device 100 fully closed, and a maximum distance between the speaker 108 and the microphone 112 may correspond to the computing device 100 being fully open (if the lid portion 102 does not rotate past 180° relative to the base portion 104) or may correspond to the computing device 100 being opened 180° (if the lid portion 102 does rotate past 180° relative to the base portion 104.

Figure 4:
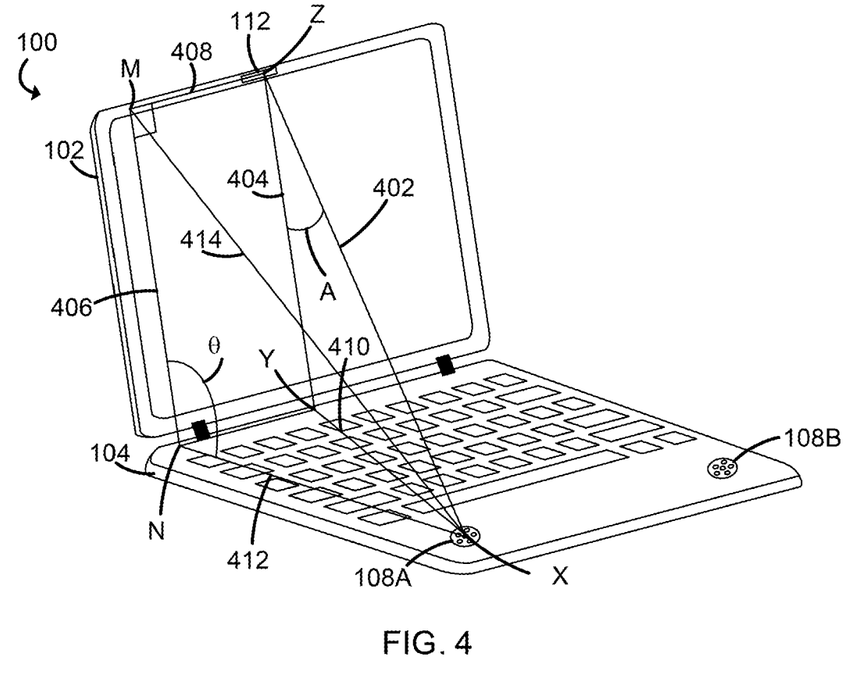
FIG. 4 is a simplified drawing of the computing device of FIG. 1 depicting the geometry of a signal sent from a speaker to a microphone.

Referring now to FIG. 4, with a known position of a speaker 108 in a base portion 104, a known position of a microphone 112 in a lid portion 102, and a known distance between the speaker 108 and the microphone 112, determining an angle between the lid portion 102 and the base portion 104 can be done geometrically. The point X represents the position of the speaker 108A. The point Z represents the position of the microphone 112. The point N represents the point that is the intersection between the axis of rotation of the hinge 106 and a perpendicular line drawn from the axis of rotation of the hinge 106 towards the point X. The point Y represents the point that is the intersection between the axis of rotation of the hinge 106 and a perpendicular line drawn from the axis of rotation of the hinge 106 towards the point Z. The point M represents the point that lies along a line drawn from N perpendicular from the axis of rotation of the hinge 106 that is an equal distance away from the hinge 106 as the point Z. The angle θ is the angle between the lid portion 102 and the base portion 104. The angle A represents the angle between line $\overline{XZ}$ 402 and the line $\overline{YZ}$ 404.

The length of lines $\overline{YZ}$ 404, $\overline{MN}$ 406, $\overline{MZ}$ 408, $\overline{XY}$ 410, and $\overline{NX}$ 412 are all fixed and known, based on the position of the speaker 108A and the microphone 112. The length of line $\overline{XY}$ 402 is measured by the time-of-flight determiner 310. The angle <XMZ is fixed to 90°. Using the Pythagorean theorem, $\overline{XZ}^2 = \overline{MZ}^2 + \overline{MX}^2$, or, alternatively, $\overline{MX} = \sqrt{\overline{XZ}^2 - \overline{MZ}^2}$. Using the law of cosines, the lengths of the sides of the triangle MNX are related by the equation $\overline{MX}^2 = \overline{MN}^2 + \overline{NX}^2 - 2\overline{MN}\,\overline{NX} \cos \theta$. Rearranging the equation to solve for θ gives $$\theta = \cos^{-1}\left(\frac{\overline{MN}^2 + \overline{NX}^2 - \overline{MX}^2}{2\overline{MN}\,\overline{NX}}\right).$$

Figure 5:
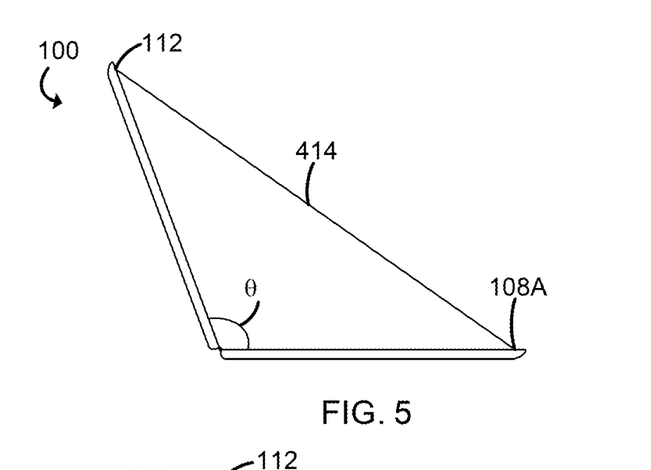
FIG. 5 is s simplified drawing of the computing device of FIG. 1 with a lid at a relative angle of over 90°.
Figure 6:
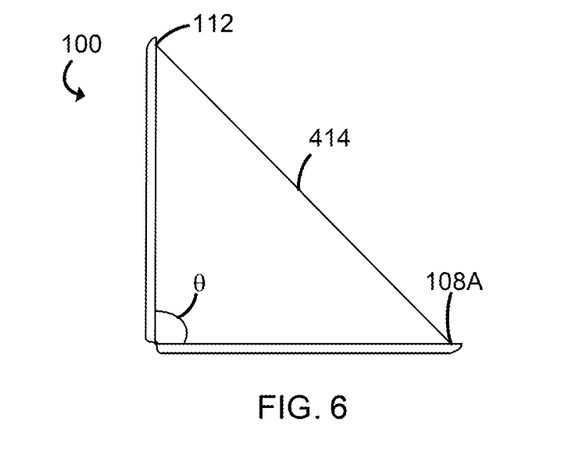
FIG. 6 is s simplified drawing of the computing device of FIG. 1 with a lid at a relative angle at approximately 90°.
Figure 7:
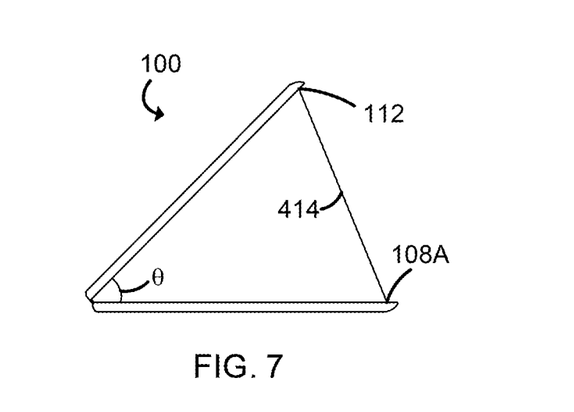
FIG. 7 is s simplified drawing of the computing device of FIG. 1 with a lid at a relative angle of less than 90°.

Referring now to FIGS. 5-7, different values of θ will lead to different lengths for the line $\overline{MX}$ 414, as shown in the figures. For example, FIG. 5 depicts the computing device 100 with an angle θ>90°, FIG. 6 shows the computing device 100 with an angle θ=90°, and FIG. 7 shows the computing device 100 with an angle θ<90°.

Referring back to FIG. 3, in the illustrative embodiment, the lid angle determiner 306 may be configured to determine the angle B periodically, continuously, continually, or upon a trigger. For example, the lid angle determiner 306 may determine the angle θ every 10-1,000 milliseconds. In the illustrative example, the lid angle determiner 306 determines the angle every 100 milliseconds. In some embodiments, the lid angle determiner 306 may determine the angle B when a trigger, such as data from another sensor or a user input, indicates that it should do so. For example, an accelerometer may indicate that the lid angle B may have changed, a user input may indicate that the lid angle may have changed or should be checked, etc. In some embodiments, the lid angle determiner 306 may determine the angle when the low-power camera controller 308 indicates that a scene monitored by the low-power camera controller 308 has changed by at least a threshold amount.

It should be appreciated that, in the illustrative embodiment, the lid angle determiner 306 may be able to distinguish between the angle θ being larger than 180° and being less than 180°, removing any possible ambiguity when the lid 102 of the computing device 100 can be rotated more than 180°. For example, the lid angle determiner 306 may determine an absolute or relative amplitude of a signal emitted by the speaker 108 that is received by the microphone 112 and use that information to determine whether the angle θ is more or less than 180°.

The low-power camera controller 308, which may be embodied as hardware, firmware, software, virtualized hardware, emulated architecture, and/or a combination thereof as discussed above, is configured to control a low-power camera 212. In the illustrative embodiment, the low-power camera 212 may be able to operate in an "always-on" mode with minimal power usage to both operate the camera 212 and process images from the camera 212. The low-power camera 212 may have a relatively low resolution, such as 16×16. The low-power camera controller 308, which may be located in a companion die, may capture one or more images from the low-power camera 212 to determine a current scene visible to the low-power camera 212. If the scene in a subsequent image from the low-power camera 212 changes by at least a threshold amount, the low-power camera controller 308 may trigger the lid angle determiner 306 to determine the angle θ.

It should be appreciated that the computing device 100 may take an action in response to determining the angle θ of the lid portion 102 relative to the base portion 104. For example, if the angle θ is below a threshold amount (such as 1-20°), the computing device 100 may enter a low-power state, such as a standby or hibernate state. If the angle θ is above a threshold amount (such as 160-200°), the computing device 100 may enter a tablet mode in which, e.g., a display format is changed, a touch screen is enabled, a keyboard is disabled, etc.

Figure 8:
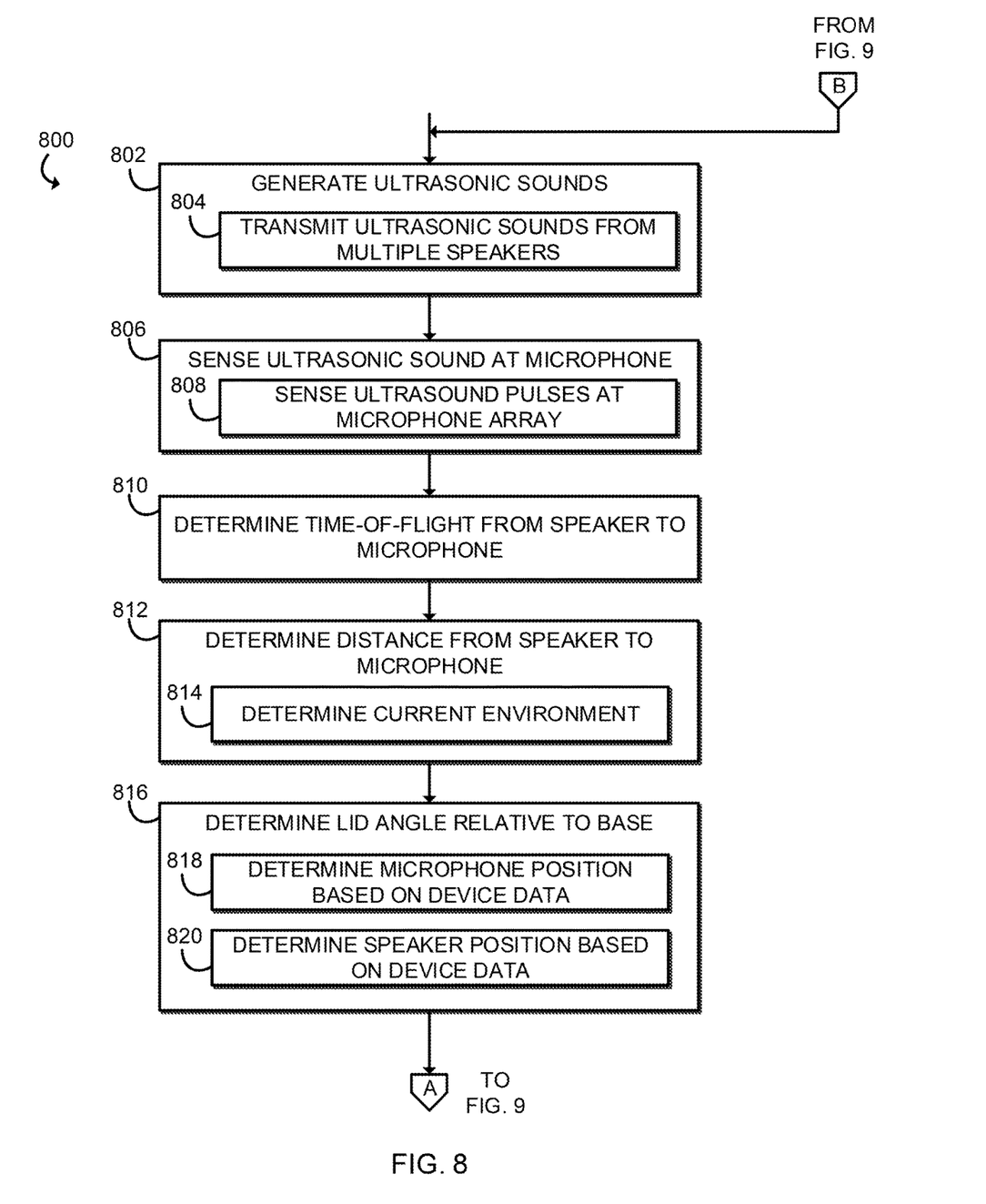
FIGS. 8-9 are a simplified flow diagram of at least one embodiment of a method for determining an angle of a lid relative to a base that may be executed by the computing device of FIG. 1.

Referring now to FIG. 8, in use, the computing device 100 may execute a method 800 for determining an angle between a lid portion 102 and a base portion 104 of the computing device 100. The method 800 begins in block 802, in which the computing device 100 generates ultrasonic sounds, such as one or more ultrasonic sound pulses. The ultrasonic sound pulses may be at any suitable ultrasonic frequency, such as 20-40 kHz. An ultrasonic sound pulse may be of any suitable duration, such as 25 microseconds to 50 milliseconds. The computing device 100 may generate any suitable ultrasonic sound, such as an ultrasonic sound with any suitable combination of one or more frequencies that may have a particular phase or timing relation, a chirped ultrasonic sound pulse, etc. In some embodiments, the computing device 100 may generate sound that is partially or completely not in the ultrasound range. In some embodiments, in block 804, the computing device 100 can use beamforming techniques to cause an array of speakers 108 to direct a sound signal in a particular direction, such as towards one or more possible locations of the microphone 112.

In block 806, the computing device 100 senses the sound generated in block 802 at one or more microphones 112. In some embodiments, the computing device 100 may apply a filter to signals from the microphones that pass the ultrasonic sounds generated in block 802 in order to determine the time-of-flight to the microphone 112. Such an approach may protect the privacy of the user of the computing device 100 by filtering out any noises of speech that should not be accessible to the computing device 100 when the microphones 112 are not otherwise in use. In some embodiments, in block 808, the computing device 100 can use beamforming techniques to process signals from an array of microphones 112 to apply spatial filters, such as selectively filtering for sound coming from one or more possible locations of the speakers 108.

In block 810, the computing device 100 determines a time-of-flight from the speaker 108 to the microphone 112. To do so, the computing device 100 can use a timestamp or other timing information for a signal generated by the speaker 108 and a signal sensed by the microphone 112. By comparing the delay in the signals, the computing device 100 can determine the time of flight from the speaker 108 to the microphone 112. It should be appreciated that, in the illustrative embodiment, the microphone 112 and the speaker 108 (and/or the microphone controller 304 and the speaker controller 302) are driven by or otherwise synchronized to the same clock. For example, the microphone 112 may have an associated clock signal that is locked or otherwise synchronized to (or is the same as) a system clock signal of the computing device 100, and the speaker 108 may have an associated clock signal that is locked or otherwise synchronized to (or is the same as) the system clock signal the computing device 100. As such, in the illustrative embodiment, the relative timing of a signal being generated by the speaker 108 and sensed by the microphone 112 can be determined precisely, without needing to compensate for any difference in timekeeping between the two devices.

In block 812, the computing device 100 determines the distance between the speaker 108 and the microphone 112. For example, if the speed of sound is 343 meters per second, then an ultrasonic pulse that takes 729 microseconds to propagate from the speaker 108 to a microphone 112 indicates a distance between the speaker 108 and the microphone 112 of $$343 \frac{\text{meters}}{\text{second}} \times 729 \text{ microseconds} = 25 \text{ centimeters.}$$

The precision of the measurement of the time-of-flight may depend on the frequency of the sound being used. For example, the computing device 100 may be able to determine the timing of the sensing of an ultrasonic pulse to the generation of the pulse to within, e.g., one-quarter of a wavelength of the carrier wave. For a carrier frequency of, e.g., 40 kHz, such a precision would lead to an uncertainty in the time-of-flight of about 6 microseconds, which would correspond to a distance uncertainty of about 2 millimeters.

In the illustrative embodiment, the computing device 100 determines the time of flight by comparing a pulse received at a microphone 112 with a pulse sent by a speaker 108. In other embodiments, the computing device 100 may determine the time of flight in a different manner. For example, the computing device 100 may determine a phase between a signal generated by the speaker 108 and detected at the microphone 112 for each of two or more frequencies, and use the phases to determine a time-of-flight or distance between the speaker 108 and the microphone 112.

It should be appreciated that the speed of sound is not constant but may depend on, e.g., temperature, humidity, ambient pressure, etc. In some embodiments, the computing device 100 may use a speed of sound of, e.g., 343 meters per second regardless of the ambient conditions. In other embodiments, in block 814, the computing device 100 may determine one or more parameters of the environment of the computing device 100, such as temperature, humidity, pressure, etc. The computing device 100 may use one or more sensors of the computing device 100, such as a temperature sensor, a hygrometer, a pressure sensor, etc. In some embodiments, the environment determiner 312 may locate the physical position of the computing device 100 using, e.g., a signal from a global positioning satellite (GPS) chip, a local network address, local WiFi devices, etc. The computing device 100 may access a server or other Internet-connected device to determine the location of the computing device 100 and/or to determine information about the environment of the computing device 100, such as temperature, humidity, or pressure. The parameters for temperature, humidity, and/or pressure may then be used to determine a local speed of sound more precisely.

In block 816, with the knowledge of the distance between the speaker 108 and the microphone 112, the computing device 100 determines the angle θ between the lid portion 102 and the base portion 104. In the illustrative embodiment, the computing device 100 first determines a position of the microphone 112 in block 818 and a position of the speaker 108 in block 820. The computing device 100 may, e.g., access information related to the particular model of the computing device 100 that is stored locally and/or remotely. In some embodiments, the computing device 100 may undergo a calibration period, such as by monitoring the distance between the speaker 108 and the microphone 112 as the lid portion 102 is rotated relative to the base portion 104 by a user. For example, a minimum distance between the speaker 108 and the microphone 112 may correspond to the computing device 100 fully closed, and a maximum distance between the speaker 108 and the microphone 112 may correspond to the computing device 100 being fully open (if the lid portion 102 does not rotate past 180° relative to the base portion 104) or may correspond to the computing device 100 being opened 180° (if the lid portion 102 does rotate past 180° relative to the base portion 104. As discussed above in more detail, the computing device 100 may determine the distance of the line $\overline{MX}$ 414 to be $\overline{MX} = \sqrt{\overline{XZ}^2 - \overline{MZ}^2}$ and may determine the angle θ to be $$\theta = \cos^{-1}\left(\frac{\overline{MN}^2 + \overline{NX}^2 - \overline{MX}^2}{2\overline{MN}\,\overline{NX}}\right).$$

Figure 9:
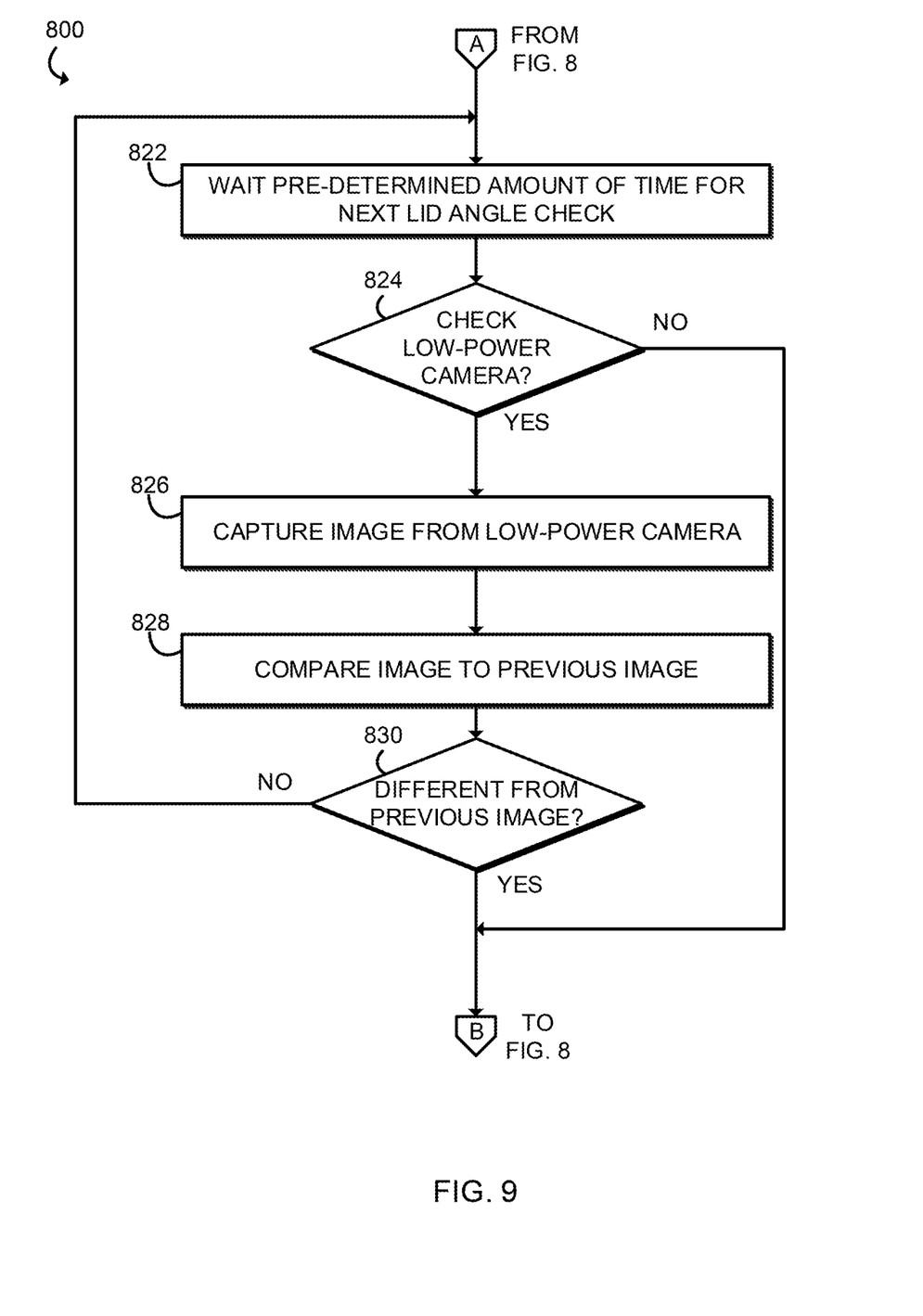

Referring now to FIG. 9, in block 822, the computing device 100 may wait a pre-determined amount of time before checking for the angle of the lid portion 102 relative to the base portion 104. For example, the computing device 100 may wait 10-1,000 milliseconds. In the illustrative example, the computing device 100 waits 100 milliseconds.

In block 824, if the computing device 100 is to check a low-power camera 212 before determining the angle of the lid portion 102, the method 800 proceeds to block 826. In block 826, the computing device 100 captures an image from a low-power camera 212. In block 828, the computing device 100 compares the image from the low-power camera 212 to a previously-captured image. In block 830, if the new image is different from the previous image by at least a threshold amount, the method 800 loops back to block 802 in FIG. 8 to generate one or more ultrasonic sounds. If the new image is not different from the previous image by at least a threshold amount, the method 800 loops back to block 822 to wait a pre-determined amount of time again.

Referring back to block 824, if the computing device 100 is not to check a low-power camera 212 before proceeding with another check of the orientation of the lid portion 102 relative to the base portion 104, the method 800 loops back to block 802 in FIG. 8 to generate one or more ultrasonic sounds.

EXAMPLES

Illustrative examples of the technologies disclosed herein are provided below. An embodiment of the technologies may include any one or more, and any combination of, the examples described below.

Example 1 includes a computing device for determining an angle of a lid relative to a base of the computing device, the computing device comprising speaker controller circuitry to generate, by one or more speakers in a first housing of the computing device, one or more ultrasonic sounds; microphone controller circuitry to sense, by one or more microphones in a second housing of the computing device, the one or more ultrasonic sounds, wherein the second housing is connected to the first housing by a hinge and is able to rotate relative to the first housing; and lid angle determiner circuitry to determine an angle of the second housing relative to the first housing based on a time between generation of the one or more ultrasonic sounds by the one or more speakers and sensation of the one or more ultrasonic sounds by the one or more microphones.

Example 2 includes the subject matter of Example 1, and wherein the lid angle determiner circuitry is further to determine a distance between the one or more speakers and the one or more microphones based on the time between generation of the one or more ultrasonic sounds by the one or more speakers and sensation of the one or more ultrasonic sounds by the one or more microphones, wherein to determine the angle of the second housing relative to the first housing comprises to determine the angle of the second housing relative to the first housing based on the distance between the one or more speakers and the one or more microphones.

Example 3 includes the subject matter of any of Examples 1 and 2, and wherein the one or more ultrasonic sounds comprises an ultrasonic sound pulse with a carrier frequency between 20 kilohertz and 50 kilohertz, wherein to determine the distance between the one or more speakers and the one or more microphones comprises to determine the distance with an uncertainty of less than half of a wavelength of the carrier frequency of the ultrasonic sound pulse.

Example 4 includes the subject matter of any of Examples 1-3, and wherein the one or more microphones are synchronized to the one or more speakers based on a clock of the computing device.

Example 5 includes the subject matter of any of Examples 1-4, and wherein the lid angle determiner circuitry is further to determine a position of the one or more speakers in the first housing; and determine a position of the one or more microphones in the second housing, wherein to determine the angle of the second housing relative to the first housing comprises to determine the angle of the second housing relative to the first housing based on the position of the one or more speakers in the first housing and the position of the one or more microphones in the second housing.

Example 6 includes the subject matter of any of Examples 1-5, and wherein the first housing is a lid portion that comprises a display and the second housing is a base portion that comprises a keyboard.

Example 7 includes the subject matter of any of Examples 1-6, and wherein the one or more speakers comprises a plurality of speakers, wherein to generate the one or more ultrasonic sounds comprises to generate, by the plurality of speakers, the one or more ultrasonic sounds in a directional pattern.

Example 8 includes the subject matter of any of Examples 1-7, and wherein the one or more microphones comprises a plurality of microphones, wherein to sense the one or more ultrasonic sounds comprises to apply a spatial filter to a signal of the plurality of microphones.

Example 9 includes the subject matter of any of Examples 1-8, and wherein the first housing is able to rotate substantially 360° relative to the second housing.

Example 10 includes the subject matter of any of Examples 1-9, and wherein the computing device does not include resistive or capacitive contact sensors or magnetic-based sensors to determine an orientation of the first housing relative to the second housing.

Example 11 includes the subject matter of any of Examples 1-10, and further including low power camera controller circuitry to monitor, with use of a camera, a scene visible by the camera; and determine whether the scene has changed by at least a threshold amount, wherein to generate the one or more ultrasonic sounds comprises to generate the one or more ultrasonic sounds in response to a determination that the scene has changed by at least the threshold amount.

Example 12 includes a method for determining an angle of a lid relative to a base of a computing device, the method comprising generating, by one or more speakers in a first housing of the computing device, one or more ultrasonic sounds; sensing, by one or more microphones in a second housing of the computing device, the one or more ultrasonic sounds, wherein the second housing is connected to the first housing by a hinge and is able to rotate relative to the first housing; and determining, by the computing device, an angle of the second housing relative to the first housing based on a time between generation of the one or more ultrasonic sounds by the one or more speakers and sensation of the one or more ultrasonic sounds by the one or more microphones.

Example 13 includes the subject matter of Example 12, and further including determining, by the computing device, a distance between the one or more speakers and the one or more microphones based on the time between generation of the one or more ultrasonic sounds by the one or more speakers and sensation of the one or more ultrasonic sounds by the one or more microphones, wherein determining the angle of the second housing relative to the first housing comprises determining, by the computing device, the angle of the second housing relative to the first housing based on the distance between the one or more speakers and the one or more microphones.

Example 14 includes the subject matter of any of Examples 12 and 13, and wherein the one or more ultrasonic sounds comprises an ultrasonic sound pulse with a carrier frequency between 20 kilohertz and 50 kilohertz, wherein determining the distance between the one or more speakers and the one or more microphones comprises determining the distance with an uncertainty of less than half of a wavelength of the carrier frequency of the ultrasonic sound pulse.

Example 15 includes the subject matter of any of Examples 12-14, and wherein the one or more microphones are synchronized to the one or more speakers based on a clock of the computing device.

Example 16 includes the subject matter of any of Examples 12-15, and further including determining a position of the one or more speakers in the first housing; and determining a position of the one or more microphones in the second housing, wherein determining the angle of the second housing relative to the first housing comprises determining the angle of the second housing relative to the first housing based on the position of the one or more speakers in the first housing and the position of the one or more microphones in the second housing.

Example 17 includes the subject matter of any of Examples 12-16, and wherein the first housing is a lid portion that comprises a display and the second housing is a base portion that comprises a keyboard.

Example 18 includes the subject matter of any of Examples 12-17, and wherein the one or more speakers comprises a plurality of speakers, wherein generating the one or more ultrasonic sounds comprises generating, by the plurality of speakers, the one or more ultrasonic sounds in a directional pattern.

Example 19 includes the subject matter of any of Examples 12-18, and wherein the one or more microphones comprises a plurality of microphones, wherein sensing the one or more ultrasonic sounds comprises applying a spatial filter to a signal of the plurality of microphones.

Example 20 includes the subject matter of any of Examples 12-19, and wherein the first housing is able to rotate substantially 360° relative to the second housing.

Example 21 includes the subject matter of any of Examples 12-20, and wherein the computing device does not include resistive or capacitive contact sensors or magnetic-based sensors to determine an orientation of the first housing relative to the second housing.

Example 22 includes the subject matter of any of Examples 12-21, and further including monitoring, by the computing device and with use of a camera, a scene visible by the camera; and determining, by the computing device, whether the scene has changed by at least a threshold amount, wherein generating the one or more ultrasonic sounds comprises generating the one or more ultrasonic sounds in response to a determination that the scene has changed by at least the threshold amount.

Example 23 includes the subject matter of any of Examples 12-22, and further including determining, by the computing device, whether the angle of the second housing relative to the first housing is below a threshold; transitioning, by the computing device, into a low-power state in response to a determination that the angle of the second housing relative to the first housing is below the threshold.

Example 24 includes the subject matter of any of Examples 12-23, and further including determining, by the computing device, whether the angle of the second housing relative to the first housing is above a threshold; transitioning, by the computing device, into a tablet mode in response to a determination that the angle of the second housing relative to the first housing is above the threshold.

Example 25 includes one or more computer-readable media comprising a plurality of instructions stored thereon that, when executed, causes a computing device to generate, by one or more speakers in a first housing of the computing device, one or more ultrasonic sounds; sense, by one or more microphones in a second housing of the computing device, the one or more ultrasonic sounds, wherein the second housing is connected to the first housing by a hinge and is able to rotate relative to the first housing; and determine an angle of the second housing relative to the first housing based on a time between generation of the one or more ultrasonic sounds by the one or more speakers and sensation of the one or more ultrasonic sounds by the one or more microphones.

Example 26 includes the subject matter of Example 25, and wherein the plurality of instructions further causes the computing device to determine a distance between the one or more speakers and the one or more microphones based on the time between generation of the one or more ultrasonic sounds by the one or more speakers and sensation of the one or more ultrasonic sounds by the one or more microphones, wherein to determine the angle of the second housing relative to the first housing comprises to determine the angle of the second housing relative to the first housing based on the distance between the one or more speakers and the one or more microphones.

Example 27 includes the subject matter of any of Examples 25 and 26, and wherein the one or more ultrasonic sounds comprises an ultrasonic sound pulse with a carrier frequency between 20 kilohertz and 50 kilohertz, wherein to determine the distance between the one or more speakers and the one or more microphones comprises to determine the distance with an uncertainty of less than half of a wavelength of the carrier frequency of the ultrasonic sound pulse.

Example 28 includes the subject matter of any of Examples 25-27, and wherein the one or more microphones are synchronized to the one or more speakers based on a clock of the computing device.

Example 29 includes the subject matter of any of Examples 25-28, and wherein the plurality of instructions further causes the computing device to determine a position of the one or more speakers in the first housing; and determine a position of the one or more microphones in the second housing, wherein to determine the angle of the second housing relative to the first housing comprises to determine the angle of the second housing relative to the first housing based on the position of the one or more speakers in the first housing and the position of the one or more microphones in the second housing.

Example 30 includes the subject matter of any of Examples 25-29, and wherein the first housing is a lid portion that comprises a display and the second housing is a base portion that comprises a keyboard.

Example 31 includes the subject matter of any of Examples 25-30, and wherein the one or more speakers comprises a plurality of speakers, wherein to generate the one or more ultrasonic sounds comprises to generate, by the plurality of speakers, the one or more ultrasonic sounds in a directional pattern.

Example 32 includes the subject matter of any of Examples 25-31, and wherein the one or more microphones comprises a plurality of microphones, wherein to sense the one or more ultrasonic sounds comprises to apply a spatial filter to a signal of the plurality of microphones.

Example 33 includes the subject matter of any of Examples 25-32, and wherein the first housing is able to rotate substantially 360° relative to the second housing.

Example 34 includes the subject matter of any of Examples 25-33, and wherein the computing device does not include resistive or capacitive contact sensors or magnetic-based sensors to determine an orientation of the first housing relative to the second housing.

Example 35 includes the subject matter of any of Examples 25-34, and wherein the plurality of instructions further causes the computing device to monitor, with use of a camera, a scene visible by the camera; and determine whether the scene has changed by at least a threshold amount, wherein to generate the one or more ultrasonic sounds comprises to generate the one or more ultrasonic sounds in response to a determination that the scene has changed by at least the threshold amount.

Example 36 includes a computing device for determining an angle of a lid relative to a base of the computing device, the computing device comprising means for generating, by one or more speakers in a first housing of the computing device, one or more ultrasonic sounds; means for sensing, by one or more microphones in a second housing of the computing device, the one or more ultrasonic sounds, wherein the second housing is connected to the first housing by a hinge and is able to rotate relative to the first housing; and means for determining an angle of the second housing relative to the first housing based on a time between generation of the one or more ultrasonic sounds by the one or more speakers and sensation of the one or more ultrasonic sounds by the one or more microphones.

Example 37 includes the subject matter of Example 36, and further including means for determining a distance between the one or more speakers and the one or more microphones based on the time between generation of the one or more ultrasonic sounds by the one or more speakers and sensation of the one or more ultrasonic sounds by the one or more microphones, wherein the means for determining the angle of the second housing relative to the first housing comprises means for determining the angle of the second housing relative to the first housing based on the distance between the one or more speakers and the one or more microphones.

Example 38 includes the subject matter of any of Examples 36 and 37, and wherein the one or more ultrasonic sounds comprises an ultrasonic sound pulse with a carrier frequency between 20 kilohertz and 50 kilohertz, wherein the means for determining the distance between the one or more speakers and the one or more microphones comprises means for determining the distance with an uncertainty of less than half of a wavelength of the carrier frequency of the ultrasonic sound pulse.

Example 39 includes the subject matter of any of Examples 36-38, and wherein the one or more microphones are synchronized to the one or more speakers based on a clock of the computing device.

Example 40 includes the subject matter of any of Examples 36-39, and further including means for determining a position of the one or more speakers in the first housing; and means for determining a position of the one or more microphones in the second housing, wherein the means for determining the angle of the second housing relative to the first housing comprises means for determining the angle of the second housing relative to the first housing based on the position of the one or more speakers in the first housing and the position of the one or more microphones in the second housing.

Example 41 includes the subject matter of any of Examples 36-40, and wherein the first housing is a lid portion that comprises a display and the second housing is a base portion that comprises a keyboard.

Example 42 includes the subject matter of any of Examples 36-41, and wherein the one or more speakers comprises a plurality of speakers, wherein the means for generating the one or more ultrasonic sounds comprises means for generating, by the plurality of speakers, the one or more ultrasonic sounds in a directional pattern.

Example 43 includes the subject matter of any of Examples 36-42, and wherein the one or more microphones comprises a plurality of microphones, wherein the means for sensing the one or more ultrasonic sounds comprises means for applying a spatial filter to a signal of the plurality of microphones.

Example 44 includes the subject matter of any of Examples 36-43, and wherein the first housing is able to rotate substantially 360° relative to the second housing.

Example 45 includes the subject matter of any of Examples 36-44, and wherein the computing device does not include resistive or capacitive contact sensors or magnetic-based sensors to determine an orientation of the first housing relative to the second housing.

Example 46 includes the subject matter of any of Examples 36-45, and further including means for monitoring, with use of a camera, a scene visible by the camera; and means for determining whether the scene has changed by at least a threshold amount, wherein the means for generating the one or more ultrasonic sounds comprises means for generating the one or more ultrasonic sounds in response to a determination that the scene has changed by at least the threshold amount.

The invention claimed is:

1. A computing device for determining an angle of a lid relative to a base of the computing device, the computing device comprising:
    speaker controller circuitry to generate, by one or more speakers in a first housing of the computing device, one or more ultrasonic sounds;
    microphone controller circuitry to sense, by one or more microphones in a second housing of the computing device, the one or more ultrasonic sounds, wherein the second housing is connected to the first housing by a hinge and is able to rotate relative to the first housing; and
    lid angle determiner circuitry to determine an angle of the second housing relative to the first housing based on a time between generation of the one or more ultrasonic sounds by the one or more speakers and sensation of the one or more ultrasonic sounds by the one or more microphones.

2. The computing device of claim 1, wherein the lid angle determiner circuitry is further to determine a distance between the one or more speakers and the one or more microphones based on the time between generation of the one or more ultrasonic sounds by the one or more speakers and sensation of the one or more ultrasonic sounds by the one or more microphones,
    wherein to determine the angle of the second housing relative to the first housing comprises to determine the angle of the second housing relative to the first housing based on the distance between the one or more speakers and the one or more microphones.

3. The computing device of claim 2, wherein the one or more ultrasonic sounds comprises an ultrasonic sound pulse with a carrier frequency between 20 kilohertz and 50 kilohertz,
    wherein to determine the distance between the one or more speakers and the one or more microphones comprises to determine the distance with an uncertainty of less than half of a wavelength of the carrier frequency of the ultrasonic sound pulse.

4. The computing device of claim 1, wherein the one or more microphones are synchronized to the one or more speakers based on a clock of the computing device.

5. The computing device of claim 1, wherein the lid angle determiner circuitry is further to:
    determine a position of the one or more speakers in the first housing; and
    determine a position of the one or more microphones in the second housing,
    wherein to determine the angle of the second housing relative to the first housing comprises to determine the angle of the second housing relative to the first housing based on the position of the one or more speakers in the first housing and the position of the one or more microphones in the second housing.

6. The computing device of claim 1, wherein the first housing is a lid portion that comprises a display and the second housing is a base portion that comprises a keyboard.

7. The computing device of claim 1, wherein the one or more speakers comprises a plurality of speakers, wherein to generate the one or more ultrasonic sounds comprises to generate, by the plurality of speakers, the one or more ultrasonic sounds in a directional pattern.

8. The computing device of claim 1, wherein the one or more microphones comprises a plurality of microphones, wherein to sense the one or more ultrasonic sounds comprises to apply a spatial filter to a signal of the plurality of microphones.

9. The computing device of claim 1, wherein the first housing is able to rotate substantially 360° relative to the second housing.

10. The computing device of claim 1, wherein the computing device does not include resistive or capacitive contact sensors or magnetic-based sensors to determine an orientation of the first housing relative to the second housing.

11. The computing device of claim 1, further comprising low power camera controller circuitry to:
    monitor, with use of a camera, a scene visible by the camera; and
    determine whether the scene has changed by at least a threshold amount,
    wherein to generate the one or more ultrasonic sounds comprises to generate the one or more ultrasonic sounds in response to a determination that the scene has changed by at least the threshold amount.

12. A method for determining an angle of a lid relative to a base of a computing device, the method comprising:
    generating, by one or more speakers in a first housing of the computing device, one or more ultrasonic sounds;
    sensing, by one or more microphones in a second housing of the computing device, the one or more ultrasonic sounds, wherein the second housing is connected to the first housing by a hinge and is able to rotate relative to the first housing; and
    determining, by the computing device, an angle of the second housing relative to the first housing based on a time between generation of the one or more ultrasonic sounds by the one or more speakers and sensation of the one or more ultrasonic sounds by the one or more microphones.

13. The method of claim 12, further comprising determining, by the computing device, a distance between the one or more speakers and the one or more microphones based on the time between generation of the one or more ultrasonic sounds by the one or more speakers and sensation of the one or more ultrasonic sounds by the one or more microphones,
wherein determining the angle of the second housing relative to the first housing comprises determining, by the computing device, the angle of the second housing relative to the first housing based on the distance between the one or more speakers and the one or more microphones.

14. The method of claim 13, wherein the one or more ultrasonic sounds comprises an ultrasonic sound pulse with a carrier frequency between 20 kilohertz and 50 kilohertz,
wherein determining the distance between the one or more speakers and the one or more microphones comprises determining the distance with an uncertainty of less than half of a wavelength of the carrier frequency of the ultrasonic sound pulse.

15. The method of claim 12, further comprising:
determining a position of the one or more speakers in the first housing; and
determining a position of the one or more microphones in the second housing,
wherein determining the angle of the second housing relative to the first housing comprises determining the angle of the second housing relative to the first housing based on the position of the one or more speakers in the first housing and the position of the one or more microphones in the second housing.

16. The method of claim 12, wherein the one or more microphones comprises a plurality of microphones, wherein sensing the one or more ultrasonic sounds comprises applying a spatial filter to a signal of the plurality of microphones.

17. The method of claim 12, wherein the first housing is able to rotate substantially 360° relative to the second housing.

18. The method of claim 12, wherein the computing device does not include resistive or capacitive contact sensors or magnetic-based sensors to determine an orientation of the first housing relative to the second housing.

19. The method of claim 12, further comprising:
monitoring, by the computing device and with use of a camera, a scene visible by the camera; and
determining, by the computing device, whether the scene has changed by at least a threshold amount,
wherein generating the one or more ultrasonic sounds comprises generating the one or more ultrasonic sounds in response to a determination that the scene has changed by at least the threshold amount.

20. One or more non-transitory computer-readable media comprising a plurality of instructions stored thereon that, when executed, causes a computing device to:
generate, by one or more speakers in a first housing of the computing device, one or more ultrasonic sounds;
sense, by one or more microphones in a second housing of the computing device, the one or more ultrasonic sounds, wherein the second housing is connected to the first housing by a hinge and is able to rotate relative to the first housing; and
determine an angle of the second housing relative to the first housing based on a time between generation of the one or more ultrasonic sounds by the one or more speakers and sensation of the one or more ultrasonic sounds by the one or more microphones.

21. The one or more non-transitory computer-readable media of claim 20, wherein the plurality of instructions further causes the computing device to determine a distance between the one or more speakers and the one or more microphones based on the time between generation of the one or more ultrasonic sounds by the one or more speakers and sensation of the one or more ultrasonic sounds by the one or more microphones,
wherein to determine the angle of the second housing relative to the first housing comprises to determine the angle of the second housing relative to the first housing based on the distance between the one or more speakers and the one or more microphones.

22. The one or more non-transitory computer-readable media of claim 21, wherein the one or more ultrasonic sounds comprises an ultrasonic sound pulse with a carrier frequency between 20 kilohertz and 50 kilohertz,
wherein to determine the distance between the one or more speakers and the one or more microphones comprises to determine the distance with an uncertainty of less than half of a wavelength of the carrier frequency of the ultrasonic sound pulse.

23. The one or more non-transitory computer-readable media of claim 20, wherein the one or more microphones are synchronized to the one or more speakers based on a clock of the computing device.

24. The one or more non-transitory computer-readable media of claim 20, wherein the plurality of instructions further causes the computing device to:
determine a position of the one or more speakers in the first housing; and
determine a position of the one or more microphones in the second housing,
wherein to determine the angle of the second housing relative to the first housing comprises to determine the angle of the second housing relative to the first housing based on the position of the one or more speakers in the first housing and the position of the one or more microphones in the second housing.

25. The one or more non-transitory computer-readable media of claim 20, wherein the plurality of instructions further causes the computing device to:
monitor, with use of a camera, a scene visible by the camera; and
determine whether the scene has changed by at least a threshold amount,
wherein to generate the one or more ultrasonic sounds comprises to generate the one or more ultrasonic sounds in response to a determination that the scene has changed by at least the threshold amount.

* * * * *